United States Patent [19]

Grabowski et al.

[11] 3,714,652
[45] Jan. 30, 1973

[54] SINGLE ERROR CHANNEL MONOPULSE SYSTEM

[75] Inventors: Joseph P. Grabowski, Willingboro; Walter E. Powell, Jr., Cinnaminson, both of N.J.

[73] Assignee: The United States of America as represented by the Secretary of the Navy

[22] Filed: April 19, 1971

[21] Appl. No.: 134,969

[52] U.S. Cl. .................... 343/16, 343/756, 343/786
[51] Int. Cl. ................................................ G01s 9/22
[58] Field of Search .......... 343/16 R, 16 M, 756, 786

[56] References Cited

UNITED STATES PATENTS

| | | | |
|---|---|---|---|
| 2,931,033 | 3/1960 | Miller | 343/16 M X |
| 3,560,976 | 2/1971 | Foldes | 343/16 M X |

*Primary Examiner* — T. H. Tubbesing
*Attorney* — R. S. Sciascia, O. E. Hodges and J. I. Rosenblatt

[57] ABSTRACT

This is a monopulse system for deriving the azimuth and elevation error signals in a single channel, eliminating the second error channel used in the conventional monopulse systems and reducing the number of channels required for the sum azimuth and elevation error signals from three to two channels. This reduction from three to two channels is accomplished by introducing a mode generator in the throat of the feed horn. The mode generator selectively changes the phase of signals in certain modes while leaving the phases of other modes uneffected. These selected signals are processed through a circular polarizer which introduces a time phase delay to the signals unaffected by the mode generator so that in the single error channel two signals appear, the azimuth and the elevation error signals, with the elevation error delayed 90° in relation to the azimuth error. These signals are in phase quadrature, can be processed by basic phase comparison techniques and the azimuth and elevation and error information can be separately extracted.

22 Claims, 5 Drawing Figures

SINGLE ERROR CHANNEL MONOPULSE SYSTEM

DESCRIPTION OF THE PRIOR ART

Monopulse radar systems using four and five port exciters are well known in the art, however, these monopulse systems presently used required at least two channels to generate the azimuth and the elevation error signals; a channel is required for each of the error signals.

SUMMARY OF THE INVENTION

This invention pertains to the field of monopulse antenna systems and particularly pertains to a multimode feed system producing monopulse tracking patterns for two orthogonal tracking planes while using a single tracking channel for azimuth and elevation signals.

With the understanding that reciprocity exists between the transmitting and the receiving mode of this system, the invention is summarized first with respect to a transmitting mode.

Illumination patterns are generated for sum, azimuth error and elevation error by the appropriate combination of modes in the mode generator and phaser section of the feed system. If vertical polarization is introduced into the four symmetrical square waveguide inputs of the mode generator such that the upper pair of square waveguides is fed 180° out of phase with the lower pairs, the field configuration at the input to the mode generator is equivalent to the sum of equal amplitudes of the $TE_{11}$ and $TM_{11}$ modes. In the mode generator section, the relative phase between the $TE_{11}$ mode and the $TM_{11}$ mode can be changed 180° by means of specially configured step ridges centered on each wall of the mode generator. The output of the mode generator feed horn will then be a horizontally polarized azimuth E plane error pattern.

A horizontally polarized $TE_{20}$ mode, H plane elevation error pattern can be generated, if horizontal polarization is introduced at the four symmetrical waveguide inputs such that the upper and lower pairs of the waveguide inputs are 180° out of phase. The mode generator has no effect on the $TE_{20}$ mode so that this mode passes through the mode generator unchanged.

Referring now to a received signal, it is seen that an azimuth E plane error signal appearing at the feed horn is rotated 90° by the mode generator so that the output of the mode generator entering the four port exciter is a vertically polarized E plane azimuth error pattern. This vertical azimuth E plane error pattern enters the polarizer and passes through the polarizer with zero degrees time phase delay compared to horizontal E fields entering the polarizer. A power divider combines the upper and lower pairs of the square waveguide sections into a single upper and lower waveguide connected to a magic tee hybrid. The error signal is then developed at the difference port of the magic tee hybrid and the sum signal portion of the received signal is developed at the sum port of the magic tee hybrid.

The elevation error signal ($TE_{20}$ mode) enters the feed horn and passes through the mode generator unchanged by the mode generator. The horizontal E fields then enter the polarizer where vertical E field components are generated at the polarizer output. These vertical E fields have been delayed 90° in time phase compared to the vertical E fields from the azimuth error signal. A power divider combines the upper and lower pairs of square guide sections into a single upper and lower waveguide connected to a magic tee hybrid. Since the vertical E fields of the elevation error signal have been delayed 90° in time phase compared to the vertical E fields from the azimuth error signal return, two error signals from two orthogonal tracking planes appear at the difference port of the magic tee hybrid and these signals appear in phase quadrature. These phase quadrature signals can then be processed by basic phase comparison circuits, used in monopulse tracking systems, so the azimuth and elevation error signals can be extracted from a single channel while the sum signal is extracted from the sum port of the magic tee hybrid.

BRIEF DESCRIPTION OF THE DRAWINGS

FIG. 1a shows a section view of the mode generator multimode feed horn, and four port exciter of FIG. 1.

FIG. 4 shows the sum pattern ($TE_{10} + LSE_{12}$ modes) generated by the system and is included to orient the reader to the system.

DESCRIPTION OF THE PREFERRED EMBODIMENT

Figure 1:
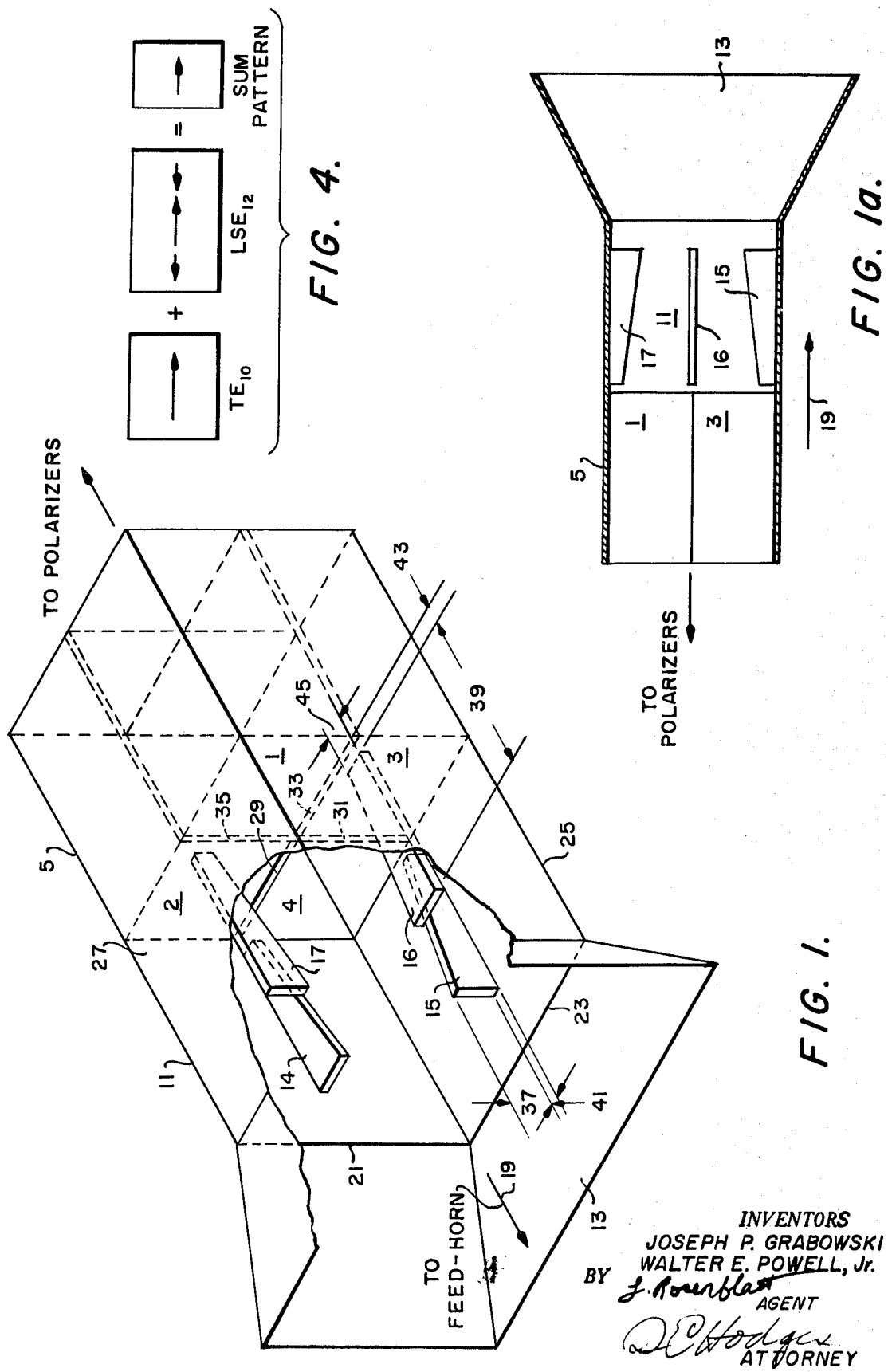
FIG. 1 shows in perspective and partly exposed the multimode feed horn four port exciter and the mode generator.

Reference is now made to FIG. 1a, wherein is shown in a sectional view, the four port exciter, mode generator and multimode feed horn sections of the monopulse system comprising the four port exciter 5 (exciter ports 1 and 3 shown), the mode generator section 11, and the multimode feed horn 13. As shown in the view of FIG. 1a, the mode generator section 11, comprises a plurality of step ridges, step ridges 15 and 17 being shown. The direction of propagation of the transmitted and radiated signal designated by arrow 19 is from the four port exciters past the mode generator and spacer section 11 and through feed horn 13 to the target.

A received signal would be received at feed horn 13 and is propagated past the mode generator section 11 to the four port exciter 5.

Referring now to FIG. 1, the mode generator section and the four port exciter is shown in perspective and partially exposed. As shown in FIG. 1, the mode generator section comprises step ridges 14, 15, 16 and 17, these step ridges being located on walls 21, 23, 25 and 27 of the mode generator section 11. The plane of each step ridge is perpendicular to the plane of its respective wall. In addition, each step ridge is aligned with an interior waveguide wall separating two ports of the four port exciter (ridge 14 aligned with wall 29, ridge 15 aligned with wall 31, ridge 16 aligned with wall 33, and ridge 17 aligned with wall 35).

The step ridges shown in FIG. 1, are used to generate the proper proportion of the $LSE_{12}$ mode (FIG. 4) to shape the sum pattern ($TE_{10} + LSE_{12}$) for high aperture efficiency and to cause a relative 180° phase variation between the $TE_{11}$ and the $TM_{11}$ modes thereby rotating the E plane error pattern ($LSE_{11}$ mode) 90°.

Although there is no precise way to define the configuration of the step ridges, the step ridges may be optimized by a trial and error approach well known in the art. The considerations for the approximate sizes of the ridge dimensions are as follows:

a. The height 37 determines primarily the proportion of the $LSE_{12}$ mode generated and should be approximately $0.3\lambda$;

b. The length 39, effects the proportion of the $LSE_{12}$ mode generated and primarily the relative phase between the $TE_{11}$ and the $TM_{11}$ modes and should be approximately $1\lambda$;

c. The thinness 41, effects the $TE_{20}$ mode, thin ridges are used to minimize any change in the $TE_{20}$ mode and should be approximately $1/16\lambda$;

d. The gap 43, between the step ridge and the four port exciter effects the phasing and generation of the $LSE_{11}$ mode and should be approximately $1/16\lambda$;

e. The taper angle of the ridges, defined by dimension 45, 39 and 37, aids in optimizing the relative phasing of the $TE_{11}$ and $TM_{11}$ modes; and f. The dimension of each of the walls 21 and 25, of the mode generator section should be approximately $1.3\lambda$.

Figure 2:
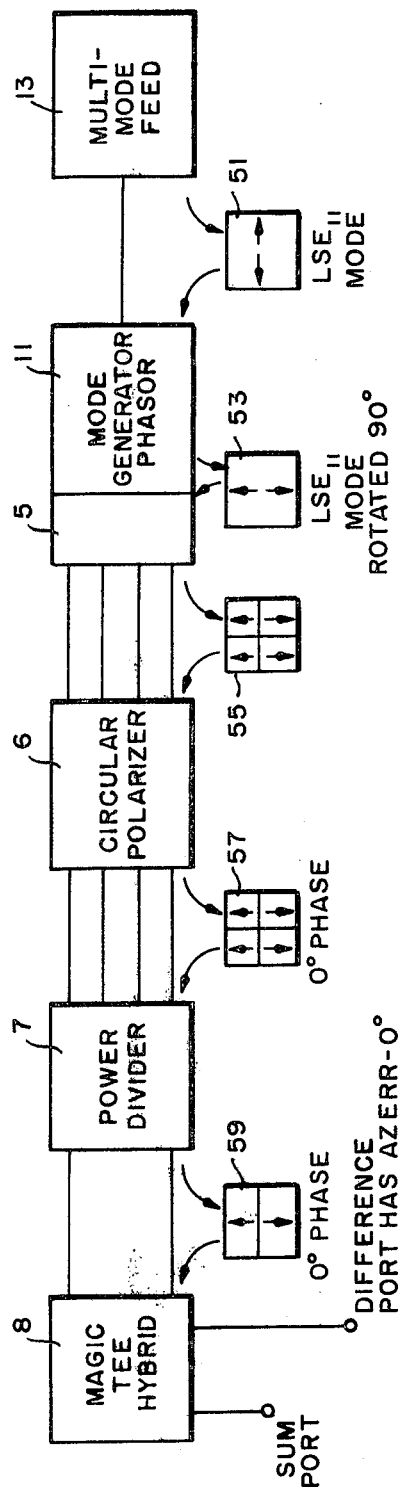
FIG. 2 is a block diagram of the system showing the generation of the azimuth error signal at the difference port of the magic tee hybrid.

In FIG. 2, the system is shown in a block diagram. The azimuth error signal E field patterns are shown at various stages within the system.

The sum pattern ($TE_{10} + LSE_{12}$) is shown in FIG. 4, to orient the reader to the system's transmitted and received signals. During transmission a sum pattern ($TE_{10}$ mode) is generated through the four port exciter. The height and length of each of the step ridges 14-17 effects the proportion of the $LSE_{12}$ mode generated. The $LSE_{12}$ mode generated in the mode generator section combines with the sum $TE_{10}$ pattern to produce the resultant sum pattern ($TE_{10} + LSE_{12}$) as shown in FIG. 4.

When a return signal is received from a target off axis in the azimuth plane, the E fields generated in the feed horn 13 produce an amplitude unbalance across the horn aperature in the azimuth plane. The return signal generates the sum pattern ($TE_{10} + LSE_{12}$) and the E plane error pattern ($LSE_{11}$ mode) as shown in block 51 of FIG. 2. The mode generator section 11, causes a rotation of the $LSE_{11}$ mode such that its E fields are vertical by changing the relative phase between its $TE_{11}$ and $TM_{11}$ modes by 180°, as shown in block 51 and block 53 of FIG. 2. Four vertical E fields are then generated in the four port exciter 5, as shown in block 55. These four vertical E fields enter the circular polarizer 6, and pass through the polarizer with zero degree time phase delay as shown in block 57, compared to the horizontal E fields entering the polarizer. The power divider 7, combines the upper and lower pairs of square waveguide section connected to the polarizer output, into single upper and a single lower waveguides which feed the magic tee hybrid 8. The error signal, the difference between the upper and lower waveguide signals feeding the magic tee hybrid is developed at the difference channel port of the magic tee hybrid. The sum signal is developed at the sum channel port of the magic tee hybrid as in conventional monopulse radar systems.

Figure 3:
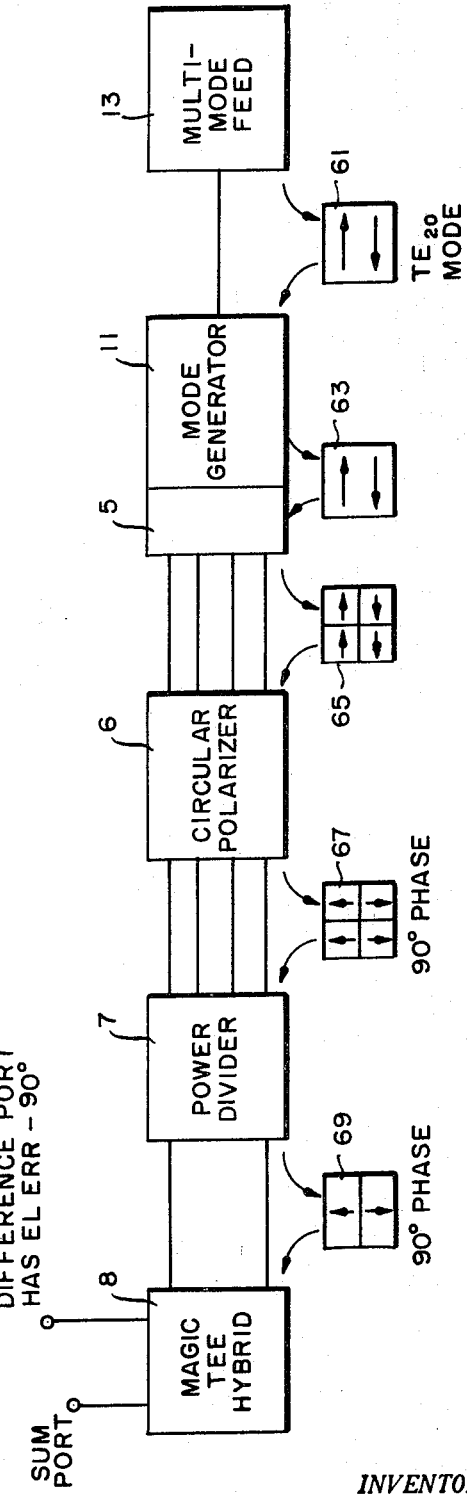
FIG. 3 is a block diagram of the system showing elevation error signal generation at the difference port of the magic tee hybrid.

Referring now to FIG. 3, the process for deriving the elevation error signal is shown. In FIG. 3, the block diagram is the same as that shown in FIG. 2, with the same numbers representing the same and similarly operating parts. The sum pattern ($TE_{10}$ mode) is generated in the four port exciter 5. The length 39 and height 37 of the step ridges affects the proportion of $LSE_{12}$ mode generated. The $LSE_{12}$ mode generated in the mode generator combines with the $TE_{10}$ mode to produce the resultant sum pattern ($TE_{10} + LSE_{12}$) as shown in FIG. 4, which is transmitted through the horn 13 and radiated into space.

When a return signal is received from a target off axis in the elevation plane the E field generated in the horn 13 introduces an amplitude unbalance in the vertical plane of the horn aperature. This imbalance comprises the sum pattern mode ($TE_{10} + LSE_{12}$) and the H plane error pattern mode $TE_{20}$. The mode generator has no effect on the $TE_{20}$ mode, the step ridges being thin (less than $1/16\lambda$) so as not to effect the $TE_{20}$ mode. The $TE_{20}$ mode then propagates unchanged through the mode generator 11, to the four port exciter 5, as shown in blocks 61 and 63 of FIG. 3. The four horizontal E fields at output of the four port exciter 5 enter the circular polarizer 6, where vertical E fields components are generated at the polarizer output. These vertical E fields have been delayed 90° in time phase compared to the vertical E fields from the azimuth error signal return, shown in block 57. The power divider 7, combines the upper and lower pairs of square guide section into a single upper and a single lower waveguide as shown in blocks 69, which feed the magic tee hybrid. The elevation error signal is developed at the difference channel port of the magic tee hybrid 8 and the sum signal is developed at the sum channel port.

We see therefore, that two error signals are developed at the single difference channel port of the magic tee hybrid: an azimuth error signal and an elevation error signal. However, these signals are in time phase quadrature as the vertical E fields generated by the elevation error signal are delayed 90° in time phase compared to the vertical E fields from the azimuth error signal. These signals being in phase quadrature can be processed by basic phase comparison techniques to separately detect the azimuth and elevation error signals.

Obviously many modifications and variations of the present invention are possible in the light of the above teachings. It is therefore to be understood that within the scope of the appended claims the invention may be practiced otherwise than as specifically described.

What is claimed is:

1. A single error channel monopulse system comprising:

a multimode feed horn for transmitting monopulse signals and for receiving monopulse E plane error signal patterns;

a mode generator connected to said feed horn for receiving said E plane error signal and for rotating by 90 degrees the E plane error pattern mode signal received from a target off axis in the azimuth plane;

said mode generator receiving an elevation E plane error pattern from said feed horn and passing said elevation E plane error pattern mode unchanged through said generator;

means connected to said mode generator for generating vertical E field components from said elevation E plane error pattern mode;

said vertical E field components being in time phase quadrature relative to said rotated azimuth E plane error pattern; and means connected to said generating means for detecting said azimuth and elevation error signals to determine the target azimuth and elevation error.

2. The system of claim 1, wherein said detecting means includes a means to derive the monopulse sum, elevation, and azimuth error signals;

said deriving means having a single error channel for deriving said time phase quadrature related azimuth and elevation error signals.

3. The system of claim 2, wherein:

said deriving means is a magic tee hybrid having input terminals and first and second output terminals;

said sum signal being developed at said first output terminal and said azimuth and elevation phase quadrature related signals being developed at said second output terminal.

4. The system of claim 3, wherein:

said rotating means comprises a waveguide;

a four port exciter;

said waveguide being connected at one end to said multimode feed horn and being connected at its other end to said four port exciter;

said waveguide having means on the interior of each of the four walls of said waveguide for mode generation and phase variation of transmitted and received monopulse signals.

5. The system of claim 4, wherein:

said means is a step ridge mounted on each of said waveguide walls.

6. The system of claim 5 wherein:

each wall of said four port exciter being coextensive with its connecting waveguide wall;

said four port exciter having intersecting interior walls defining the said four ports.

7. The system of claim 4, wherein:

said means for mode generation and phase variation is responsive to the sum $TE_{10}$ pattern mode, generates a $LSE_{12}$ mode to shape the said sum pattern transmitted from said multimode feed horn;

said means for mode generation and phase variation responsive to an azimuth E plane error pattern mode causing a time phase variation between the $TE_{11}$ and $TM_{11}$ modes of the azimuth E plane error pattern in the $LSE_{11}$ mode and rotating said $LSE_{11}$ E field pattern by 90°.

8. The system of claim 7, wherein:

said means for mode generation is a step ridge mounted on each of said waveguide walls;

the amount of said $LSE_{12}$ mode generated is functionally related to the height of each said step ridge and the length of each said step ridge;

said phase difference between said $TM_{11}$ and $TM_{12}$ mode is functionally related to each said step ridge length;

the effect of said step ridges on the elevation error E plane pattern in the $TE_{20}$ mode being functionally related to the thinness of each said step ridge relative to wave length of the $TE_{20}$ mode signal;

said step ridges being spaced apart from said four port interior walls by a gap;

the phase of said $LSE_{11}$ mode being functionally related to said gap size; and the relative phasing between said $TM_{11}$ and $TE_{11}$ modes being functionally related to the taper angle of each said step ridges.

9. The system of claim 4, wherein said means to generate vertical E fields components comprises circular polarizers;

each said circular polarizer having an input connected to a respective port of said four port exciter for receiving the error signal from said respective port;

a power divider connected to the output of said circular polarizers for combining the signals from the upper pair of said waveguides of said four port exciter into a single signal and for combining the signals from the lower pair of waveguides of said four port exciter into a single second signal;

said magic tee hybrid being connected to receive said first and second signals for developing the sum signal at said sum port and for developing said azimuth and elevation error signals at said difference port;

said means for mode generation and phase variation responsive to an azimuth E plane error pattern mode causing a time phase variation between the $TE_{11}$ and $TM_{11}$ modes of the azimuth E plane error in the $LSE_{11}$ pattern mode and rotating said $LSE_{11}$ E fields by 90°.

10. The system of claim 3, wherein:

said means to generate vertical E field components from said elevation error signal comprises circular polarizers.

11. A mode generator, comprising a feed horn;

a waveguide;

a four port exciter;

said waveguide being connected at one end to said feed horn and being connected at said other end to said four port exciter; and said waveguide having step ridges on each of its four walls for mode generation and phase variation of transmitted and received monopulse signals.

12. The system of claim 11, wherein:

a step ridge is mounted on each of said waveguide walls;.

13. The system of claim 12, wherein: each said four port exciter wall is coextensive with its abutting waveguide wall;

said four port waveguide having intersecting interior walls for defining said four ports; and each said step ridge being mounted in the plane of an intersecting waveguide wall of said four port exciter.

14. The system of claim 11, wherein:

said step ridges, responsive to the sum $TE_{11}$ pattern mode generates a $LSE_{12}$ mode to shape the sum pattern transmitted from said multimode feed horn;

said step ridges responsive to an azimuth E plane error pattern mode causing a time phase variation between the $TE_{11}$ and $TM_{11}$ modes of the azimuth E plane error in the $LSE_{11}$ pattern mode and rotating said $LSE_{11}$ E fields by 90°.

15. The system of claim 14, wherein:

the proportion of said $LSE_{12}$ mode generated is functionally related to the height of said step ridge and to the length of said step ridge;

said phase difference between said $TM_{11}$ and $TM_{12}$ modes is functionally related to said step ridge length;

the effect of said step ridges on the elevation error E plane pattern in the $TE_{20}$ mode being functionally related to the thinness of said step ridge, relative to the wave length of the $TE_{20}$ mode signal;

said step ridges being spaced apart from the interior walls of said four port exciter by a gap;

the phase of said $LSE_{11}$ mode being functionally related to said gap; and the relative phasing between said $TM_{11}$ and $TE_{11}$ modes being functionally related to the taper angle of said step ridges.

16. A method for generating azimuth and elevation error signals in a single error channel, comprising the steps of:

rotating the azimuth E plane error signal pattern received from a target off axis in the azimuth plane by 90°;

passing the elevation E plane error signal pattern through a polarizer to generate vertical E field components for said elevation error signal delayed by 90° in time phase compared to said rotated azimuth error pattern.

17. The method of claim 16, including the steps of:

detecting the azimuth error signal from said rotated azimuth error pattern and detecting the elevation error signal from said elevation error signal delayed by 90° in time phase relative to said rotated azimuth pattern in a single error channel; and producing separate azimuth and elevation error signals from said phase quadrature related azimuth and elevation error signal.

18. A single error channel monopulse system, comprising:

means for receiving a plurality of error pattern signals;

means for changing the phase of one of said plurality of error pattern signals, with respect to the other signals of said plurality of error pattern signals, and producing phase related signals; and means for detecting said phase related error pattern signals.

19. The system of claim 18, wherein:

said means for detecting said phase related error signals is limited to a single channel for producing said plurality of phase related error pattern signals; and including means to separate and extract each of said plurality of phase related error pattern signals, connected to said single channel.

20. The system of claim 19, wherein:

said means for changing in phase includes means for rotating one of said error pattern signals with respect to said other of said plurality of error pattern signals; and said one error pattern signal being changed in phase, being a non-rotated error pattern signal.

21. The system of claim 20, wherein:

said error pattern signals are the E plane error patterns in the azimuth and elevation planes.

22. The system of claim 21, wherein:

said means for rotating rotates said azimuth signal.

* * * * *